(12) United States Patent
Cabrera et al.

(10) Patent No.: US 9,110,793 B2
(45) Date of Patent: Aug. 18, 2015

(54) INNER PROCESS

(75) Inventors: Marco Escandell Cabrera, Bellvue, WA (US); Elizabeth Murray

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 12/611,712

(22) Filed: Nov. 3, 2009
(Under 37 CFR 1.47)

(65) Prior Publication Data
US 2011/0107339 A1    May 5, 2011

(51) Int. Cl.
| | |
|---|---|
| G06F 9/00 | (2006.01) |
| G06F 12/02 | (2006.01) |
| G06F 9/48 | (2006.01) |
| G06F 9/54 | (2006.01) |
| G06F 21/79 | (2013.01) |
| G06F 12/10 | (2006.01) |

(52) U.S. Cl.
CPC .......... *G06F 12/0284* (2013.01); *G06F 9/4843* (2013.01); *G06F 9/545* (2013.01); *G06F 12/109* (2013.01); *G06F 21/79* (2013.01)

(58) Field of Classification Search
None
See application file for complete search history.

(56) References Cited

U.S. PATENT DOCUMENTS

| | | | |
|---|---|---|---|
| 5,897,658 A | | 4/1999 | Eskesen et al. |
| 6,535,929 B1 * | | 3/2003 | Provino et al. ................ 719/321 |
| 2003/0093579 A1 | | 5/2003 | Zimmer et al. |
| 2009/0282474 A1 * | | 11/2009 | Chen et al. ...................... 726/21 |
| 2011/0078361 A1 * | | 3/2011 | Chen et al. ........................ 711/6 |

* cited by examiner

*Primary Examiner* — Cheng-Yuan Tseng
*Assistant Examiner* — Craig Goldschmidt
(74) *Attorney, Agent, or Firm* — D'Ambrosio & Menon, PLLC; Usha Menon

(57) ABSTRACT

Methods, systems, and products for computer processing. In one general embodiment, the method comprises running an inner process in the context of an executing thread wherein the thread has an original address space in memory and hiding at least a portion of the memory from the inner process. The inner process may run on the same credentials as the thread. Running the inner process may include creating a new address space for the inner process in the memory and assigning the new address space to the thread, so that the inner process comprises its own address space. The inner process may he allowed to access only the new address space. The kernel may maintain the thread's original address space along with the new address space, so that multiple address spaces exist for a particular thread. The kernel may pass selected data from the thread to the inner process.

18 Claims, 4 Drawing Sheets

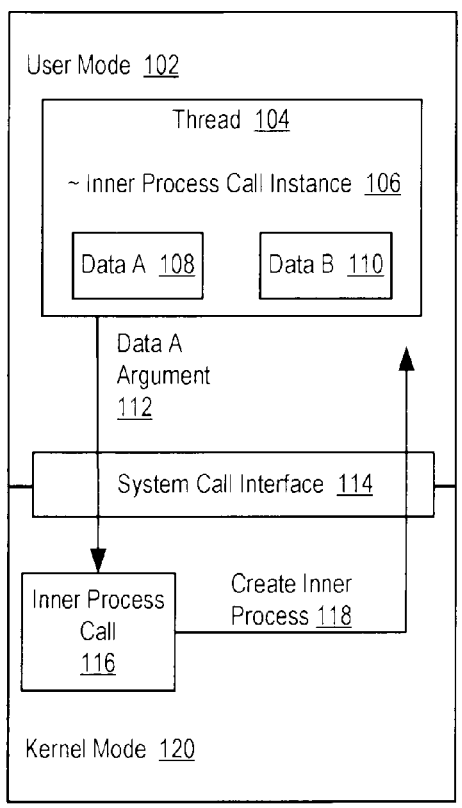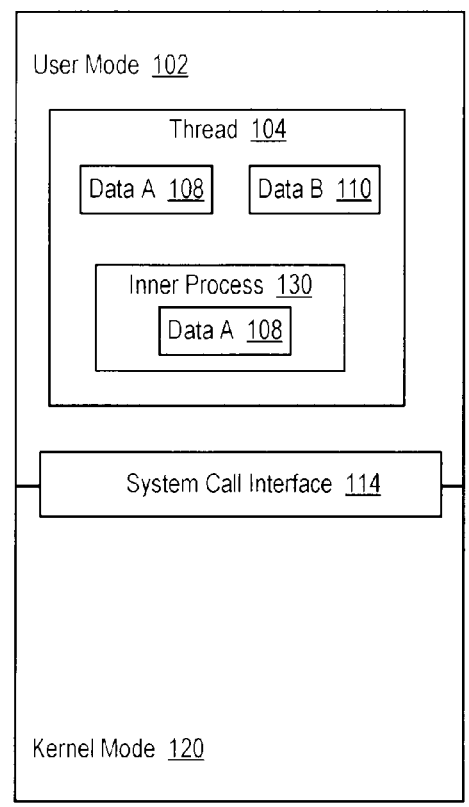
FIG. 1A
FIG. 1B

INNER PROCESS

BACKGROUND

Computer functionality is achieved through processes. A process is a program in execution including several components in memory, such as program code, data, and a process stack for holding temporary data (subroutine parameters, return addresses, temporary variables, etc). The process includes an address space in memory (i.e., process memory) which contains these components.

Processes need to consume or expose functionality in order to produce output. Often, functionality is provided by a third party as a shared object, or library. These shared objects may be loaded into a process at runtime. When loaded into memory, these processes have access to the complete process memory.

SUMMARY

Methods, systems, and products for computer processing are disclosed herein. Embodiments of the present disclosure may be initiated through a kernel interface. In one general embodiment, the method comprises running an inner process in the context of an executing thread wherein the thread has an original address space in memory and hiding at least a portion of the memory from the inner process. The inner process may run on the same credentials as the thread. Running the inner process may include creating a new address space for the inner process in the memory and assigning the new address space to the thread, so that the inner process comprises its on address space. The inner process may be allowed to access only the new address space. The kernel may maintain the thread's original address space along with the new address space, so that multiple address spaces exist for a particular thread. The kernel may pass selected data from the thread to the inner process. The new address space may comprise a heap and a stack. Passing data selected by a user from the thread to the inner process may be carried out by exporting pointers corresponding to the selected data to the data section of the new address space. Another general embodiment includes a computer program product disposed on a computer-readable medium for computer processing, the computer program product comprising computer program instructions for running an inner process in the context of an executing thread and computer program instructions for hiding at least a portion of the memory from the inner process. Another general embodiment includes a data processing system for computer processing. The system includes a processor; and a computer memory operatively coupled to the processor. The computer memory has disposed within it computer program instructions for running an inner process in the context of an executing thread wherein the thread has an original address space in memory and computer program instructions for hiding at least a portion of the memory from the inner process.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 1A and 1B set forth a data flow diagram illustrating the invocation of an inner process through a system call interface according to embodiments of the present invention.

DETAILED DESCRIPTION

Figure 2:
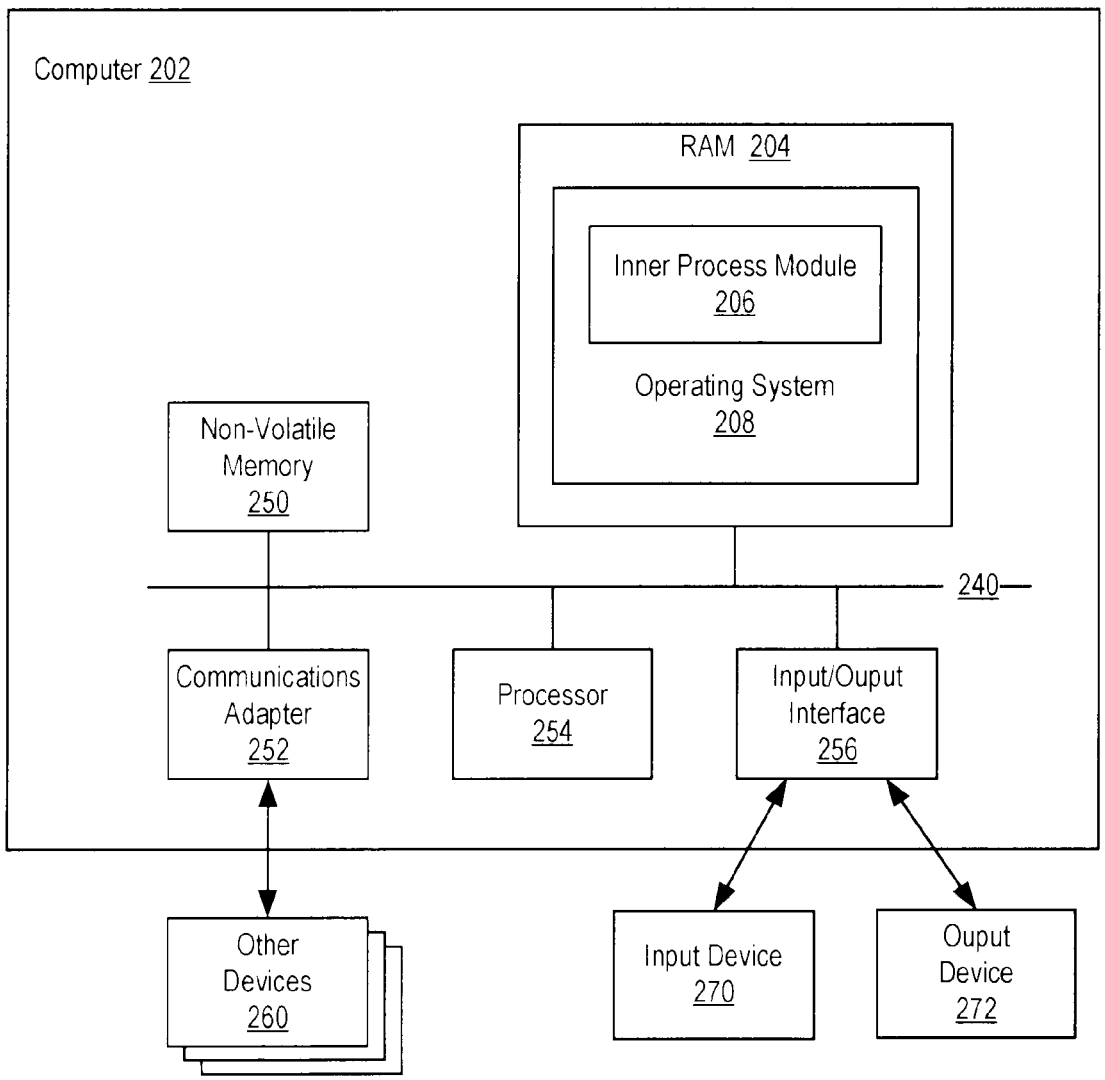
FIG. 2 sets forth a block diagram of an exemplary computer in accordance with one embodiment of the invention.

Exemplary methods, systems, and computer products for computer processing are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

Generally, embodiments of the present invention relate to an inner process running in the context of an executing thread. The inner process includes its own address space, which is assigned to the thread. Thus, a thread may have multiple process address spaces. The thread may be the only thread for a given task (for example, as in the case of a heavyweight process) or may be one of many threads existing for a task (i.e., a lightweight process). Although the thread has access to process memory, the inner process has access only to its own address space, so that the process memory as a whole is hidden from the inner process. Third-party extensions (such as shared objects) dynamically loaded into the inner process are therefore denied access to the process memory as a whole. A portion of the process memory may be exported from the thread to the inner process, such as by copying selected data or pointers representing data to the new address space, so that only data selected (by a developer, for example) is exposed to the third-party extension. Overhead and complexity associated with inter-process communication is avoided, and the inner process may run on the same credentials as the thread. The inner process may also be used to perform impersonation, or executing part of the code under different credentials, by including a credential change in an invocation of the inner process. For example, embodiments of the present disclosure may be initiated through a kernel interface. The code section (text) invoking the inner process may include arguments or options for credential change which are supported by the operating system.

FIGS. 1A and 1B set forth a data flow diagram illustrating the invocation of an inner process through a system call interface according to embodiments of the present invention. Referring to FIG. 1A (before the inner process is created), thread 104 has access to Data A 108 and Data B 110. Thread 104, executing in a user mode 102, may invoke an instance of the inner process 106 in the code section. The invocation may include arguments indicating the data from thread 104 to be passed to the inner process, such as the Data A argument 112. The instance of the inner process 106, when invoked by thread 104, may request an implementation of the inner process call 116 in kernel mode 120 through a system call interface 114 or other kernel interface. The system call interface 114 provides a software interface to services provided by the operating system and defines all the services of the operating system to threads running in user mode 102, such as thread 104. The system call interface 114 may include a system call table that has pointers to the functions that implement the system calls inside the kernel, which may be a microkernel. The system call table provides a well-defined interface to the operating system services. When implemented, the inner process call 116 creates inner process 118. Referring to FIG. 1B, the kernel has created the inner process 130 assigned the inner process to thread 104. Inner process has access only to Data A 108, which is passed to it by the kernel. Inner process 130 returns to the thread 104, which created it. Although FIGS. 1A and 1B show inner process 130 running in user mode 102, in some embodiments inner process 130 may execute in kernel mode 120.

Embodiments of the presently disclosed invention are implemented to some extent as software modules installed and running on one or more data processing systems ('computers'), such as servers, workstations, tablet computers, PCs, personal digital assistants ('PDAs'), smart phones, and so on. FIG. 2 sets forth a block diagram of an exemplary computer 202. Computer 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory may be connected through a system bus 240 to the processor 254 and to other system components. Thus, the software modules may be program instructions stored in computer memory.

An operating system 208 is stored in computer memory. Operating system 208 may be any appropriate operating system such as Windows XP, Windows Vista, Mac OS X, UNIX, LINUX, or AIX from International Business Machines Corporation (Armonk, N.Y.).

Computing device 202 may also include one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 may also include a communications adapter 252 for implementing data communications with other devices 260. Communications adapter 252 implements the hardware level of data communications through which one computer sends data communications to another computer through a network.

Also stored in computer memory is an inner process module 206, which may operate at least partially in kernel mode. The inner process module 206 includes computer program instructions for enabling an inner process as described herein. The module may include computer program instructions for creating a new address space for the inner process in the memory of the computer and assigning the new address space to the thread. The module includes computer program instructions for running an inner process in the context of an executing thread within the new address space. The computer program instructions may allow the inner process to access only the new address space so that the memory available to the thread is hidden from the inner process. The computer program instructions may provide for exporting a copy of selected data to the new address space for use by the inner process.

Inner process module 206 may be implemented as one or more sub-modules operating in separate software layers or in the same layer. Although depicted as being incorporated into the operating system 208 in FIG. 2, the inner process module 206 or one or more sub-modules making up the inner process module may be separate from the operating system. In particular, invocations of the inner process may be implemented in high-level code, such as application code. In some embodiments, the performance determination module 206 may be implemented in the software stack, in hardware, in firmware (such as in the BIOS), or in any other manner as will occur to those of ordinary skill in the art.

Figure 3:
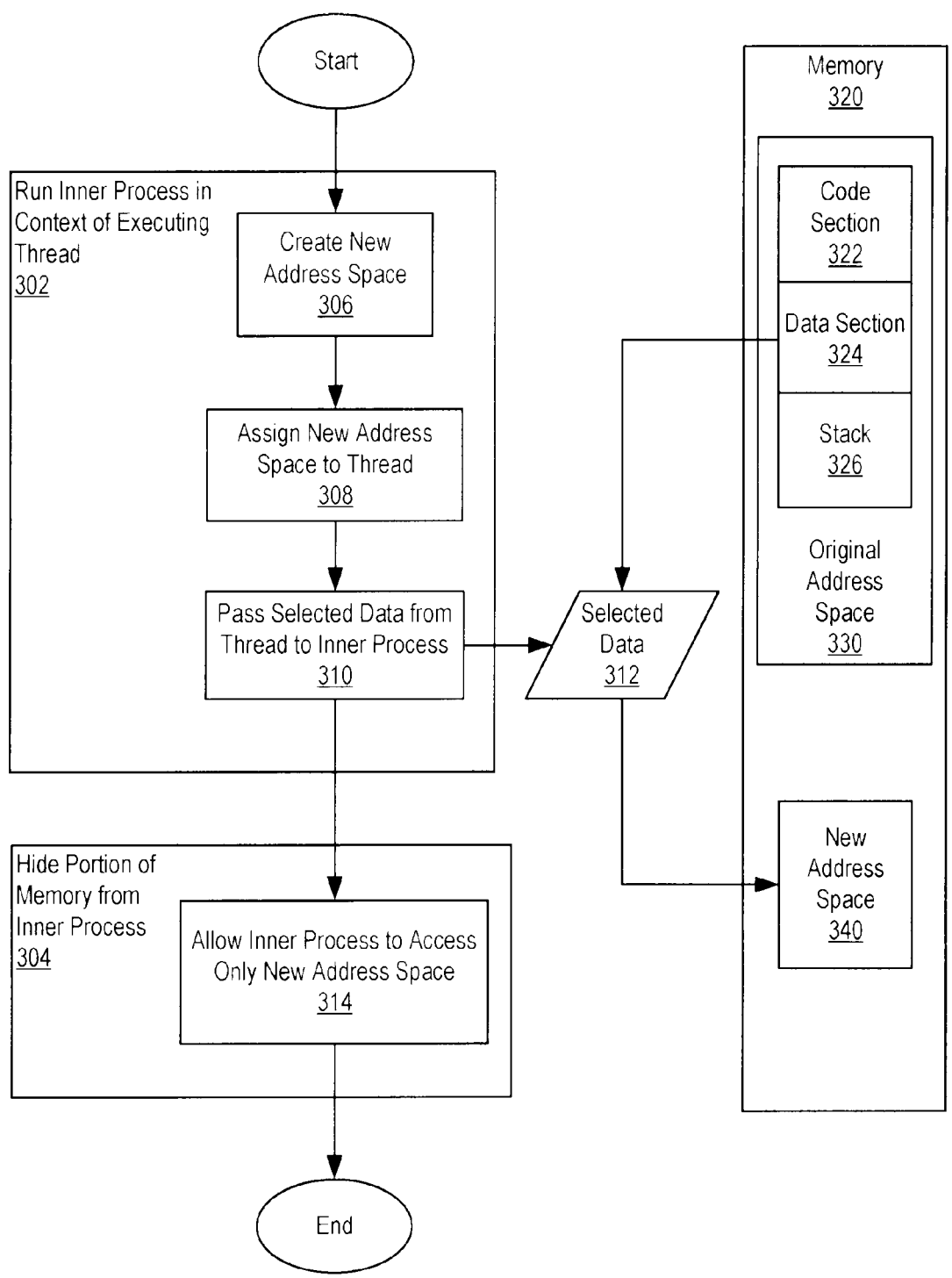
FIG. 3 is a data flow diagram illustrating a method for computer processing in accordance with one embodiment of the invention.

FIG. 3 is a data flow diagram illustrating a method for computer processing in accordance with one embodiment of the invention. The method of FIG. 3 includes running an inner process in the context of an executing thread (block 302). The method also includes hiding at least a portion of the memory 320 from the inner process (block 304).

The thread has an original address space 330 in memory 320. For example the original address space 330 may include a code section 322, a data section 324, and a stack 326. The thread may share the code section 322 and data section 324 with other threads in the same task. In one implementation, the code section 322 includes instances of one or more invocations of an inner process system call. During normal execution of the code in a thread, the system call is invoked. When invoked, the executing thread requests an implementation of the inner process system call in kernel mode through a system call interface.

Running an inner process in the context of an executing thread (block 302) may include creating a new address space 340 for the inner process in the memory 320 (block 306) and assigning the new address space 340 to the thread (block 308). Running an inner process in the context of an executing thread (block 302) may also include passing selected data 312 from the thread to the inner process (block 310). Passing the selected data 312 from the thread to the inner process (block 310) may be carried out by obtaining a pointer to the starting address of the data section and retrieving data until the end of the data file is reached. Selected data is copied to the data section of the new address space. The copy of the selected data may be a deep copy (a copy of the actual data), a shallow copy (a copy of pointers referencing the data), or a combination of each type. A new stack and heap may be created in the new address space (not shown). The new stack may contain the data passed to the inner process.

Hiding at least a portion of the memory 320 from the inner process (block 304) may be carried out by allowing the inner process to access only the new address space 340 (block 314). The translation look-aside buffer ('TLB') of the processor may also be flushed. The TLB is a table in the processor's memory that contains information about the pages in memory the processor has accessed recently.

Figure 4:
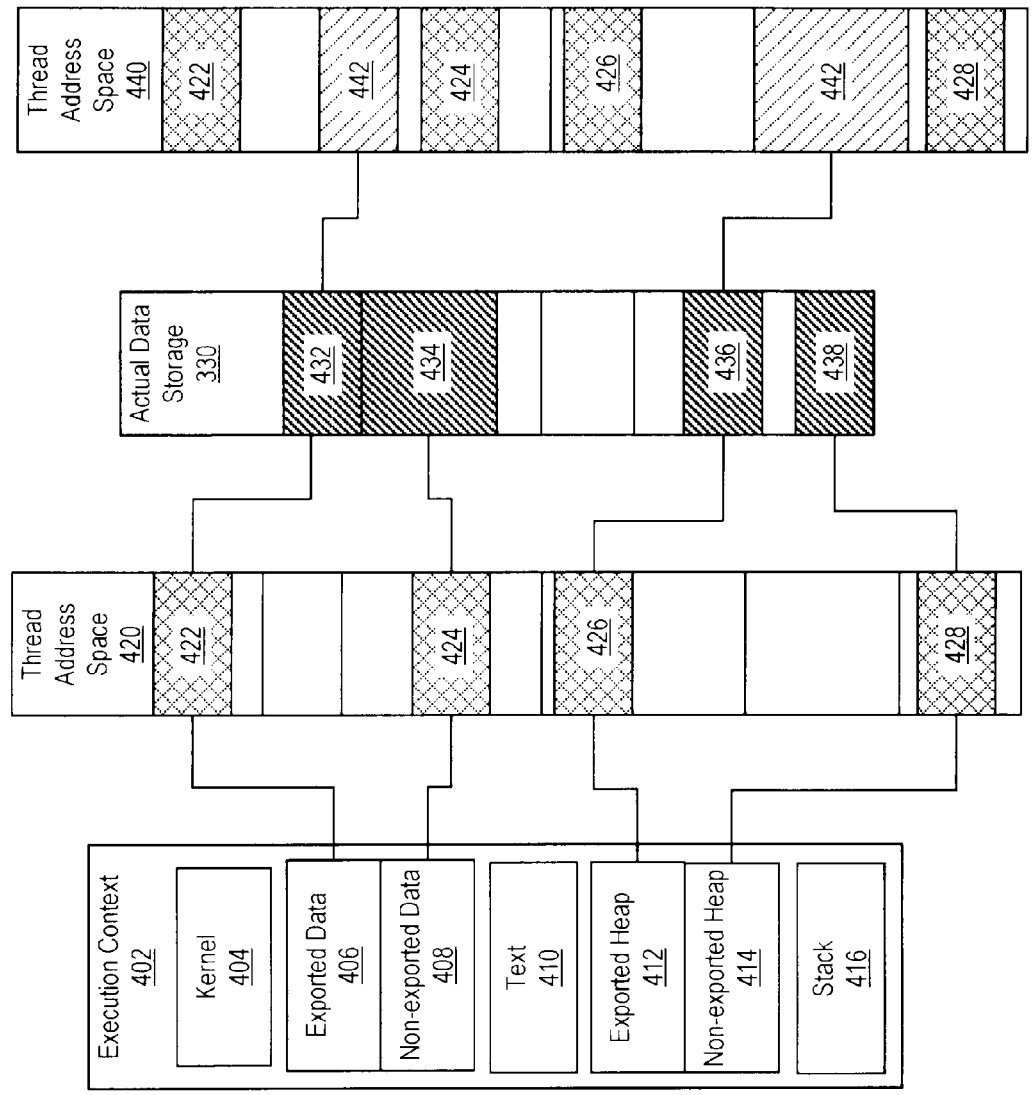
FIG. 4 is a data flow diagram illustrating address spaces for a thread and an inner process in accordance with one embodiment of the invention.

FIG. 4 is a data flow diagram illustrating address spaces for a thread and an inner process in accordance with one embodiment of the invention. The thread has an execution context 402, including thread components such as a kernel 404 (e.g. the process control block), a data section 406, 408, a text section 410, a heap 412, 414, and a stack 416. The components are stored in the thread address space 420, although only the data section 422, 424 and the heap 426, 428 are shown. In the currently described embodiment, only portions of the data section 406, 408 and the heap 412, 414 are exported to the inner process. These may be the static allocated memory and memory from the heap. The exported data 406 and the non-exported data 408 are shown as two distinct entities, but may consist of multiple data structures interleaved with one another. The exported and non-exported portions of the heap are similarly described.

Exported data 406 is stored in the address space 422, and non-exported data 408 is stored in the address space 424. Exported heap 412 is stored in the address space 426, and non-exported heap 414 is stored in address space 428. Address spaces 422-428 contain pointers that reference address spaces elsewhere in memory (such as in actual data storage 430) containing the actual information. Thread address space 420 and actual data storage 440 may be parts of the same memory structure and are only shown as separate for illustration. The exported data 406 contained by address space 422 of the thread address space 420 is a pointer pointing to the actual data stored at address space 432. Similarly, the pointer for non-exported data 408 is at address space 424 and points at address space 434, the pointer for exported heap 412 is at 426 and points at address space 436, and the pointer for non-exported heap 414 is at 428 and points at address 438. In other implementations, data may be stored without the use of pointers.

As described above, upon creation of the inner process, selected data in the data section and the heap are exported to the inner process. A new address space is created and assigned to the inner process. Thread address space 440 is identical to thread address space 420, except for the addition of the new address space. The new address space includes address spaces 442 and 446. Pointers pointing to address space 432 and 436 are stored in the new address space at address spaces 442 and 446, respectively.

In some embodiments, only stdin and stdout file descriptors are exposed to the inner process. Alternatively, all or a subset of the file descriptors may be exposed, either by default or by listing them as parameters of a call to the kernel interface.

As discussed above with reference to FIG. 1, a thread may invoke an inner process by executing code comprising an invocation of an instance of the inner process. Consider the following exemplary code section for execution in a thread for illustration:

```
DATA_TYPE exported_data
unexported_data
main( )
{
DATA_TYPE
*main_exported_pointer=(*DATA_TYPE)malloc(sizeof(DATA_TYPE);
DATA_TYPE *main_unexported
_pointer=(*DATA_TYPE)malloc(sizeof(DATA_TYPE);
...
start innerprocess(function1, [&exported_data.sizeof(exported_data);
[main_exported_pointer.sizeof(DATA_TYPE)])
```

-continued

```
...
}
function1( )
{
void *start_of_data_pointer=(void*)(address);
DATA_TYPE *exported_data=(DATA_TYPE*)start_of_data_pointer;
DATA_TYPE
*main_exported_pointer=(DATA_TYPE*)( start_of_data_pointer+
sizeof(DATA_TYPE);
dlopen(somelib)
dlsym(somelibfunction);
somelibfunction(exported_data.main_exported_pointer)
}
```

The code section above contains a main function where program execution begins. At some point within the main program, a functionality provided by a third-party extension (the library, "somelib") is needed. Before loading the library, the code section invokes the inner process using the statement "start_innerprocess", and passes as arguments a function containing the code section to be run in the inner process ("function1") along with data from the data section required by the function to operate. Data may be passed as pointers, so that the data section of the inner process includes pointers that point to the physical address of the data a user wishes to expose. The function running within the inner process includes statements for loading the dynamic library file ("dlopen(somelib)") and obtaining the address of a function within the library ("dlsym(somelibfunction)"). The function also includes a statement, "somelibfunction(exported_data, main_exported_pointer)", for calling the function with the exported data and pointer as arguments.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for facilitating processing associated with a computing device, the computing device comprising at least one processor and at least one memory communicatively linked to the at least one processor, one or more processes executing in each of the processors, at least one thread executing in each process, the method comprising:
    invoking an instance of an inner process call, comprising:
        creating an inner process by requesting an implementation of the inner process call by an executing thread, the thread having an original address space;
    running the inner process in the context of the thread, comprising:
        creating a new address space for the inner process;
        allocating the new address space to the thread, the thread comprising the original address space and the new address space; and
        exporting a copy of selected data and one or more pointers representing the selected data from the original address space to the new address space for use by the inner process; and
    hiding data stored outside of the new address space from the inner process.

2. The method of claim 1, further comprising:
    storing the exported copy of the selected data in a data section of the new address space.

3. The method of claim 1 wherein the inner process and the thread share credentials.

4. The method of claim 1 wherein the new address space comprises a heap.

5. The method of claim 1 wherein the new address space comprises a stack.

6. The method of claim 1 wherein the hiding data stored outside of the new address space from the inner process comprises allowing the inner process to directly access only the new address space.

7. The method of claim 1 further comprising providing the one or more pointers as an argument to a function called from within the inner process.

8. The method of claim 1, wherein the invoking an instance of an inner process call comprises requesting an implementation of the inner process call through a kernel interface.

9. A non-transitory computer-readable medium for facilitating processing associated with a computing device comprising at least one processor and at least one memory communicatively linked to the at least one processor, one or more processes executing in each of the processors, at least one thread executing in each process, the computer-readable medium comprising computer program instructions executable by the at least one processor, the computer program instructions comprising:
 computer program instructions for invoking an instance of an inner process call, comprising:
  computer program instructions for creating an inner process by requesting an implementation of the inner process call by an executing thread, the thread having an original address space;
 computer program instructions for running the inner process in the context of the thread, comprising:
  computer program instructions for creating a new address space for the inner process;
  computer program instructions for allocating the new address space to the thread, the thread comprising the original address space and the new address space; and
  computer program instructions for exporting a copy of selected data and one or more pointers representing the selected data from the original address space to the new address space for use by the inner process; and
 computer program instructions for hiding data stored outside of the new address space from the inner process.

10. The computer-readable medium of claim 9, the computer program instructions further comprising:
 computer program instructions for storing the exported copy of the selected data in a data section of the new address space.

11. The computer-readable medium of claim 9, the computer program instructions further comprising computer program instructions for providing the one or more pointers as an argument to a function called from within the inner process.

12. The computer program product of claim 9, the thread and the inner process share credentials.

13. The computer program product of claim 9 wherein the new address space comprises a heap.

14. The computer program product of claim 9 wherein the new address space comprises a stack.

15. The computer program product of claim 9 wherein the computer program instructions for hiding the data stored outside of the new address space from the inner process comprise computer program instructions for allowing the inner process to directly access only the new address space.

16. A data processing system for computer processing, the system comprising:
 a processor; and
 a memory communicatively linked to the processor, the memory storing computer program instructions executable by the processor, one or more processes executing in each of the processors, at least one thread executing in each process, the computer program instructions comprising:
  computer program instructions for invoking an instance of an inner process call, comprising:
   computer program instructions for creating an inner process by requesting an implementation of the inner process call by an executing thread, the thread having an original address space;
  computer program instructions for running the inner process in the context of the thread, comprising:
   computer program instructions for creating a new address space for the inner process, the thread comprising the original address space and the new address space;
   computer program instructions for allocating the new address space to the thread, the thread comprising the original address space and the new address space; and
   computer program instructions for exporting a copy of selected data and one or more pointers representing the selected data from the original address space to the new address space for use by the inner process; and
  computer program instructions for hiding data stored outside of the new address space from the inner process.

17. The system of claim 16, the computer program instructions stored in the memory further comprising:
 computer program instructions for storing the exported data in a data section of the new address space.

18. The system of claim 16, the computer program instructions stored in the memory further comprising computer program instructions for providing the one or more pointers as an argument to a function called from within the inner process.

* * * * *